(12) United States Patent
Chun

(10) Patent No.: US 7,103,384 B2
(45) Date of Patent: Sep. 5, 2006

(54) APPARATUS AND METHOD FOR FORMING A FORWARD LINK TRANSMISSION BEAM OF A SMART ANTENNA IN A MOBILE COMMUNICATION SYSTEM

(75) Inventor: Byung-Jin Chun, Suwon-shi (KR)

(73) Assignee: Samsung Electronics, Co., Ltd., (KR)

( * ) Notice: Subject to any disclaimer, the term of this patent is extended or adjusted under 35 U.S.C. 154(b) by 469 days.

(21) Appl. No.: 10/440,195

(22) Filed: May 19, 2003

(65) Prior Publication Data

US 2003/0216156 A1 Nov. 20, 2003

(30) Foreign Application Priority Data

May 17, 2002 (KR) ............ 10-2002-0027324

(51) Int. Cl.
*H04M 1/00* (2006.01)
*H04B 1/38* (2006.01)

(52) U.S. Cl. ............ 455/562.1; 455/561; 455/65; 455/452.1; 455/278.1; 455/517; 342/372; 342/373; 342/374; 342/378; 370/321; 370/335; 370/337

(58) Field of Classification Search ............ 455/562.1, 455/452.1, 561, 65, 278.1, 517; 342/373, 342/372, 374, 378, 379; 370/321, 335, 337
See application file for complete search history.

(56) References Cited

U.S. PATENT DOCUMENTS 5,714,957 A * 2/1998 Searle et al. ............... 342/374
5,894,598 A * 4/1999 Shoki ........................ 455/562.1
5,936,577 A * 8/1999 Shoki et al. ................ 342/373
6,058,318 A * 5/2000 Kobayakawa et al. ..... 455/562.1
6,091,788 A * 7/2000 Keskitalo et al. .......... 375/347
6,108,565 A 8/2000 Scherzer ..................... 455/562
6,144,340 A * 11/2000 Kiiski et al. ................ 342/371
6,208,294 B1 * 3/2001 Kobayakawa et al. ..... 342/373
6,347,220 B1 * 2/2002 Tanaka et al. ............. 455/277.2
6,347,234 B1 * 2/2002 Scherzer ................... 455/562.1
6,522,898 B1 * 2/2003 Kohno et al. .............. 455/562.1
6,597,678 B1 * 7/2003 Kuwahara et al. ......... 370/335
6,639,551 B1 * 10/2003 Li et al. ..................... 342/381
6,734,822 B1 * 5/2004 Kim et al. .................. 342/379
6,763,062 B1 * 7/2004 Kohno et al. .............. 375/220
6,795,424 B1 * 9/2004 Kapoor et al. ............. 370/343
6,888,882 B1 * 5/2005 Dogan ....................... 375/220

FOREIGN PATENT DOCUMENTS

| EP | 1067710 | 1/2001 |
| WO | 0163776 | 8/2001 |
| WO | 02060092 | 8/2002 |

* cited by examiner

*Primary Examiner*—Marceau Milord
(74) *Attorney, Agent, or Firm*—Roylance, Abrams, Berdo & Goodman, LLP

(57) ABSTRACT

A method and apparatus for a base station including an antenna array calculates a direction of a weight vector of a transmission beam to maximize in-phase component power for a common channel signal in a transmission channel signal for transmission to a mobile station and to minimize a sum of quadrature-phase power component and interference power for other mobile stations inside and outside a cell due to a transmission channel signal for the mobile station.

27 Claims, 7 Drawing Sheets

APPARATUS AND METHOD FOR FORMING A FORWARD LINK TRANSMISSION BEAM OF A SMART ANTENNA IN A MOBILE COMMUNICATION SYSTEM

PRIORITY

This application claims priority under 35 U.S.C. § 119 to an application entitled "Apparatus and Method for Forming Forward Link Transmission Beam of Smart Antenna in a Mobile Communication System" filed in the Korean Intellectual Property Office on May 17, 2002 and assigned Serial No. 2002-27324, the contents of which are incorporated herein by reference.

BACKGROUND OF THE INVENTION

1. Field of the Invention

The present invention relates generally to a smart antenna apparatus and method, and in particular, to an apparatus and method for forming forward link transmission beams of a smart antenna in a mobile communication system.

2. Description of the Related Art

In order to meet a rapidly increasing demand for mobile communication and provide various multimedia services to users, there is a great necessity to increase capacity of a forward link. Typically, frequency division multiple access (FDMA) and time division multiple access (TDMA) are used to secure as large a subscriber capacity as possible with the limited frequency bandwidth available. In FDMA technology, a given frequency bandwidth is divided into a plurality of frequency channels necessary for communication, so that subscribers each use unique frequency channels. However, in TDMA technology, each subscriber uses a single frequency channel only for a predetermined time slot assigned thereto. Also, code division multiple access (CDMA) has been proposed which uses the same frequency band but distinguishes subscribers by assigning different codes to the subscribers.

However, the method of increasing efficiency of a limited frequency band by these multiple access technologies has a limitation in accommodating many subscribers. In order to overcome the limitation, cellular technology has been proposed. Cellular technology refers to a mobile communication technology that divides a service area into a plurality of small regions, or cells, and uses the same frequency band at two cells sufficiently distanced from each other to increase the number of spatially distributed channels, thereby securing sufficient subscriber capacity. Moreover, it is possible to further increase base station capacity by sectoring a base station antenna. For example, a base station antenna is sectored by changing an omnidirectional antenna with a 360° radiation pattern into three directional sector antennas with a 120° radiation pattern. Particularly, in a CDMA system, if a base station antenna is sectored, noises from subscribers of other sectors are reduced, contributing to an increase in call capacity of the base station.

Such conventional omnidirectional antenna or sector antenna transmits both a common channel signal and a transmission channel signal to a mobile station through a single common beam. The common channel signal includes a pilot channel signal, a synchronization channel signal and a paging channel signal, all of which must be transmitted from a base station to all mobile stations in a corresponding cell. The transmission channel signal refers to a traffic channel signal that must be transmitted to a particular mobile station. A considerable amount of radiation energy is wasted except the radiation energy transmitted to a particular mobile station, e.g., when a particular signal such as the transmission channel signal is transmitted to the particular mobile station in the same manner as the common channel, rather than when a predetermined signal such as the common channel signal is transmitted from a base station's transmission antenna to all mobile stations. In addition, such radiation energy acts as an interference signal to other mobile stations except the corresponding mobile station.

Therefore, if it is possible to transmit a transmission channel signal in a direction of a particular mobile station by certain means, it is possible to maintain high call quality while maintaining low transmission power and reducing interference signals to other mobile stations, thereby contributing to an increase in call capacity. An antenna based on such a concept is an adaptive array antenna, also known as an intelligent antenna or smart antenna.

A smart antenna system refers to an intelligent antenna system which can automatically change its radiation beam pattern in response to a predetermined signal environment. The smart antenna system adopts a technology for arranging a plurality of antenna elements in a specific form and multiplying an output of each antenna element by a complex weight, thereby forming an antenna beam in a direction of a desired mobile station.

Such a smart antenna system is a technology that can be widely used in a mobile communication field. Herein, however, the smart antenna system will be described with reference to a CDMA cellular mobile communication system. In addition, the smart antenna system is a technology in which a base station receives only a signal transmitted from a desired mobile station, in a reverse link, and concentrates transmission power only to a desired mobile station, on a forward link. Herein, the smart antenna system will be described on the assumption that a forward link transmission beam is formed.

A method for forming a forward link transmission beam of a smart antenna in a CDMA mobile communication system is disclosed in U.S. Pat. No. 6,108,565, which is incorporated herein by reference. The disclosed method calculates forward link transmission beam forming information by estimating an angle of arrival (AOA) and a time of arrival (TOA) from signals received at an antenna array of a base station from mobile stations. In addition, the patent discloses a method for forming a forward link transmission beam for each mobile station according to the calculated AOA and TOA of a received signal. That is, a common channel signal is transmitted through a wide beam, i.e., common beam, while a transmission channel signal for each mobile station is transmitted through a narrow beam, i.e., transmission beam, according to the calculated forward link transmission beam forming information. A beamwidth of the narrow beam is determined according to the distance between a mobile station and a base station. As the distance becomes shorter, the beamwidth becomes wider, while as the distance becomes longer, the beamwidth becomes narrower. In addition, a beamwidth of the narrow beam for the transmission channel signal is controlled according to a frame error rate (FER) reported over a reverse link.

A description of a method for forming a forward link transmission beam can be separately made with reference to one case where only a common pilot channel is provided to all mobile stations in a cell and another case where a dedicated pilot channel is provided to each mobile station so that each mobile station can easily perform coherent detection. In the latter case where the dedicated pilot channel is provided, since the dedicated pilot channel and the transmission channel use the same transmission beam, phase matching between both channels is guaranteed. However, in the former case where only the common pilot channel is provided, since the common pilot channel and the transmission channel use different forward link transmission beams, phase mismatching occurs between both channels. The phase mismatching has a different aftereffect according to a modulation scheme. Generally, a mobile communication system uses a modulation scheme of BPSK (Binary Phase Shift Keying) or QPSK (Quadrature Phase Shift Keying), commonly called "MPSK (Multiple Phase Shift Keying)." When the MPSK is used as a modulation scheme, a phase difference between a common channel signal and a transmission channel signal must be minimized in order to minimize a bit error rate (BER). That is, the phase mismatching must be minimized to obtain desired call quality. Therefore, in a general mobile communication system, there is a necessity to minimize the phase mismatching.

In the CDMA mobile communication system, a signal from one user acts as an interference signal to another user, so the interference must be well controlled in order to increase channel capacity. In particular, as demand for data communication having higher power than voice communication has increased recently, the interference problem becomes more significant. The smart antenna system has been proposed to drastically reduce the interference signals by forming a forward link transmission beam so that a transmission channel signal is transmitted in a direction of a desired particular mobile station. Actually, however, a part of the transmission channel signal transmitted to the desired mobile station is provided to the other mobile stations inside and outside a cell, causing undesired interference. However, such inference is not considered in the forward link transmission beam forming method disclosed in the U.S. Pat. No. 6,108,565.

Meanwhile, if a beamwidth of a transmission beam is increased to be as wide as a beamwidth of a common beam in order to minimize phase mismatching, interference to other mobile stations is increased. In contrast, if the bandwidth of the transmission beam is decreased in order to minimize interference, the phase mismatching is increased. That is, since the two conditions have a trade-off relation, it is necessary to consider the two conditions together in order to form an optimal transmission beam.

SUMMARY OF THE INVENTION

It is, therefore, an object of the present invention to provide an apparatus and method for optimizing a forward link transmission beam by simultaneously considering an interference problem and a phase mismatching problem in a mobile communication system using a smart antenna.

It is another object of the present invention to provide an apparatus and method for calculating a direction of a weight vector of a transmission beam in order to maximize in-phase component power for a common channel signal in a transmission channel signal for a mobile station and to minimize the sum of quadrature-phase component power and interference power for other mobile stations inside and outside a cell, caused by the transmission channel signal for the mobile station, in a base station apparatus including an antenna array.

It is further another object of the present invention to provide an apparatus and method for calculating a direction of a weight vector of a transmission beam so as to minimize interference power caused because a part of a transmission channel signal for a desired particular mobile station is flowed out to other mobile stations inside and outside a cell when a dedicated pilot channel is provided, in a base station apparatus including an antenna array.

It is yet another object of the present invention to provide an apparatus and method for independently calculating direction and magnitude of a weight vector for a transmission beam for transmitting a transmission channel signal for a particular mobile station in a base station apparatus including an antenna array.

It is still another object of the present invention to provide an apparatus and method for independently calculating weight vectors of transmission beams for a plurality of mobile stations serviced by a base station apparatus including an antenna array.

To achieve the above and other objects, there is provided a transmission beam forming control apparatus of a base station, for forming a transmission beam for a transmission channel signal to be transmitted to a mobile station from an antenna array including a plurality of antenna elements. A transmission beam weight vector calculator estimates a direction of the mobile station by using a reception signal and a reverse link power control bit received from the mobile station, and calculates a transmission beam weight vector in the estimated direction. A transmission beam former applies the calculated transmission beam weight vector to the transmission channel signal and providing the applied transmission channel signal to the antenna array.

To achieve the above and other objects, there is provided a transmission beam forming control method of a base station, for forming a transmission beam for a transmission channel signal to be transmitted to a mobile station from an antenna array including a plurality of antenna elements. The method comprises the steps of estimating a direction of the mobile station by using a reception signal and a reverse link power control bit received from the mobile station, and calculating a transmission beam weight vector in the estimated direction; and applying the calculated transmission beam weight vector to the transmission channel signal; and providing the applied transmission channel signal to the antenna array.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
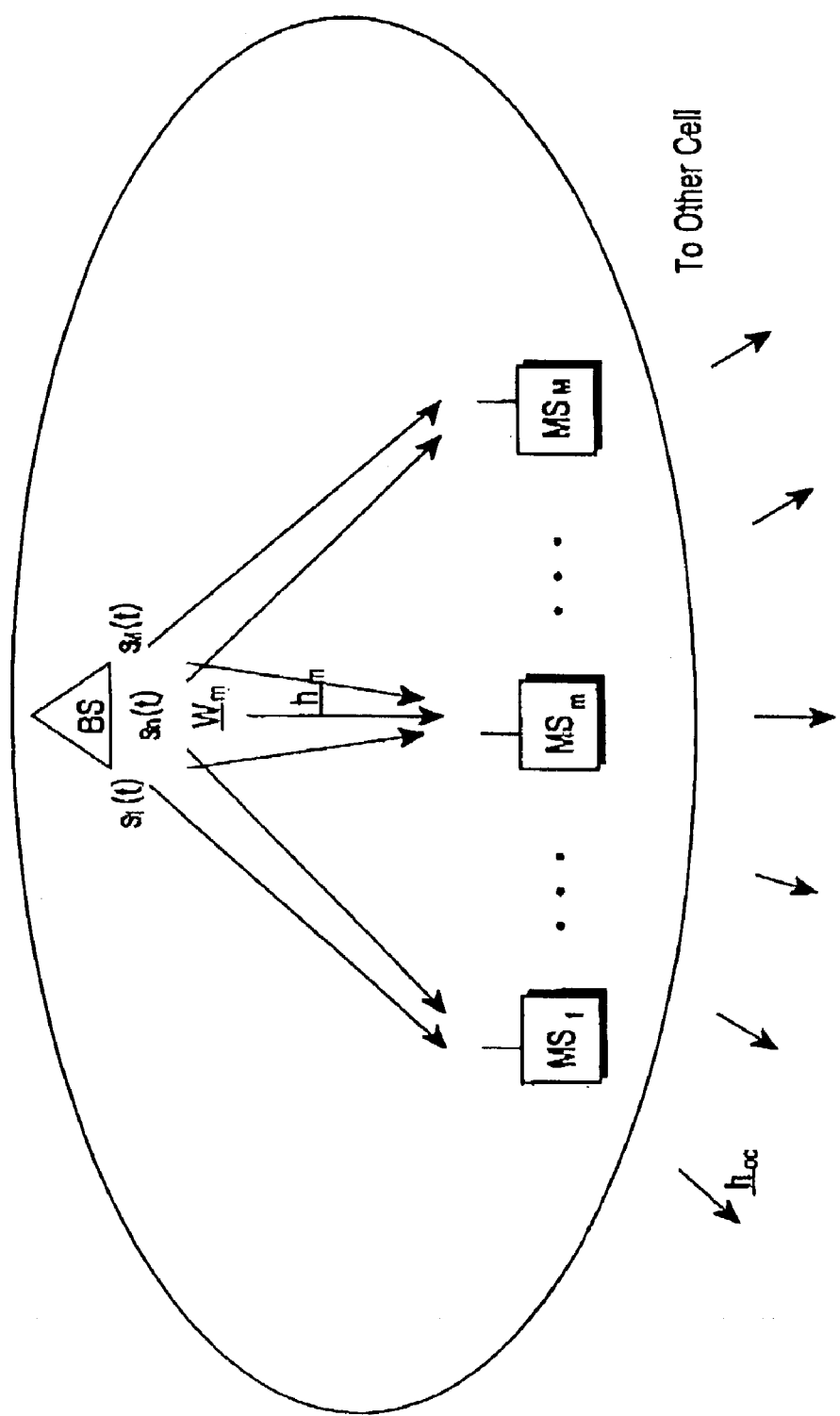
FIG. 1 is a system diagram illustrating an example of a channel model of a forward link smart antenna according to an embodiment of the present invention.

Several embodiments of the present invention will now be described in detail with reference to the accompanying drawings. In the drawings, the same or similar elements are denoted by the same reference numerals. In the following description, a detailed description of known functions and configurations incorporated herein has been omitted for conciseness.

The embodiments of the present invention will be described with reference to two different cases. The first case provides a method for calculating an optimal transmission weight vector when there is no dedicated pilot channel and only a common pilot channel exists. The second case provides a method for calculating an optimal transmission weight vector when a dedicated pilot channel exists, e.g., the special case described in conjunction with the prior art. Embodiments of the present invention can be generally applied to a current mobile communication system, such as FDMA, TDMA and CDMA. However, for convenience, the embodiments of the present invention will be described with reference to a CDMA system, especially a $3^{rd}$ generation CDMA mobile communication system such as a CDMA2000 system and a WCDMA (Wideband CDMA) system. Meanwhile, it will be assumed herein that direction and magnitude of a weight vector for a common beam were previously calculated by known means.

FIG. 1 is a system diagram illustrating an example of a channel model of a forward link smart antenna according to an embodiment of the present invention. Specifically, FIG. 1 illustrates a channel model of a forward link smart antenna on the assumption that M mobile stations $MS_i$ (i=1,2, . . . ,M) in a cell are communicating with a base station BS. In FIG. 1, $s_m(t)$ represents a forward link traffic channel signal for an $m^{th}$ mobile station MS from a base station BS, $\underline{h}_m$ represents a forward link channel response vector from the base station BS to an $m^{th}$ mobile station $MS_m$, and $\underline{w}_m$ represents a forward link weight vector from the base station BS to an $m^{th}$ mobile station $MS_m$. In addition, channel response vectors from the base station BS to a plurality of mobile stations located in other cells are represented by $\underline{h}_{oc}$.

If a forward link signal transmitted from the base station BS to mobile stations via an antenna array comprised of a plurality of antenna elements is defined as $\underline{s}(t)$, the $\underline{s}(t)$ becomes a linear combination of a common channel signal $\underline{s}_p(t)$ with a common weight vector $\underline{w}_p$ and a traffic channel signal $\underline{s}_i(t)$ (i=1,2, . . . , M) with an individual transmission weight vector $\underline{w}_i$ (i=1,2, . . . , M). That is, the $\underline{s}(t)$ can be represented by $$\underline{s}(t) = \underline{w}_p s_p(t) + \sum_{i=1}^{M} \underline{w}_i s_i(t) \qquad \text{Equation (1)}$$

Although the common channel signal includes a pilot channel signal, a synchronization channel signal and a paging channel signal, only the pilot channel signal will be designated herein as the common channel signal, for the convenience of explanation. The pilot channel signal $\underline{s}_p(t)$ is a signal transmitted over an omidirectional beam or a sector beam in order to provide time and phase criteria for coherent demodulation to mobile stations in a cell. Therefore, a weight vector $\underline{w}_p$ for the pilot channel signal should be able to entirely cover the inside of a cell or the inside of a sector. In the present examples, it is assumed that the $\underline{w}_p$ is previously calculated through known means. What is provided is a method for calculating transmission weight vectors $\underline{w}_i$ (i=1,2, . . . , M) for traffic channel signals $\underline{s}_i(t)$ (i=1, 2, . . . , M) transmitted to each of the mobile stations in the cell, by an optimal criterion. For convenience, the description will be limited to a method for calculating a transmission weight vector $\underline{w}_m$ for an $m^{th}$ mobile station $MS_m$ among M mobile stations. Of course, transmission weight vectors for the other mobile stations can also be calculated in the same method. Therefore, it is possible to independently calculate transmission weight vectors for the respective mobile stations.

When a base station transmits a signal $\underline{s}(t)$ over a radio channel, a signal $r_m(t)$ received at an $m^{th}$ mobile station $MS_m$ can be represented by $$r_m(t) = \underline{s}(t)^H \underline{h}_m \qquad \text{Equation (2)}$$

$$= \underline{w}_p^H \underline{h}_m s_p^*(t) + \sum_{i=1}^{M} \underline{w}_i^H \underline{h}_m s_i^*(t)$$

In Equation (2), * denotes a conjugate operator, and H denotes a Hermitian operator.

The signal $r_m(t)$ is divided into a pilot channel signal $r_p(t)$, a traffic channel signal $r_d(t)$ for an $m^{th}$ mobile station $MS_m$, and an interference signal $r_{imp}(t)$ indicating a signal transmitted to other mobile stations but flowed into or provided to an $m^{th}$ mobile station $MS_m$, as illustrated in Equation (3).

$$r_p(t) = \underline{w}_p^H \underline{h}_m s_p^*(t) \qquad \text{Equation (3)}$$

$$r_d(t) = \underline{w}_m^H \underline{h}_m s_m^*(t)$$

$$r_{imp}(t) = \sum_{\substack{i=1 \\ i \neq m}}^{M} \underline{w}_i^H \underline{h}_m s_i^*(t)$$

Power of each signal received at an $m^{th}$ mobile station $MS_m$ shown in Equation (3) can be expressed by Equation (4) below. In Equation (4), $P_p$ represents power of a pilot channel signal, $P_d$ represents power of a traffic channel signal, and $P_{imp}$ represents power of an interference signal.

$$P_p = \underline{w}_p^H R_m S_p \underline{w}_p \qquad \text{Equation (4)}$$

$$P_d = \underline{w}_m^H R_m S_m \underline{w}_m$$

$$P_{imp} = \sum_{\substack{i=1 \\ i \neq m}}^{M} \underline{w}_i^H R_m S_i \underline{w}_i$$

In Equation (4), $R_m$ represents a forward link transmission covariance matrix for an $m^{th}$ mobile station $MS_m$ and is $R_m = E[\underline{h}_m \underline{h}_m^H]$, and $S_p$ represents power of a pilot channel signal transmitted from a base station and is $S_p = E[|s_p(t)|^2]$. In addition, $S_i$ represents power of a forward link traffic channel signal transmitted from a base station to an $i^{th}$ mobile station $MS_i$ and is $S_i=E[|s_i(t)|^2]$, and $S_m$ represents power of a forward link traffic channel signal transmitted to an $m^{th}$ mobile station $MS_m$.

When there is no dedicated pilot channel and only a common pilot channel exists, a weight vector $\underline{w}_p$ applied to a common pilot channel is generally different from a weight vector $\underline{w}_m$ applied to a traffic channel, thus causing phase mismatching between a pilot channel signal and a traffic channel signal received at an $m^{th}$ mobile station $MS_m$, illustrated in Equation (3). Here, phase variation due to $s_p(t)$ and $s_m(t)$ of the signal is excluded.

However, since a traffic channel is synchronized by a pilot channel, a common pilot channel signal becomes a phase criterion in a mobile station. Therefore, of the traffic channel signal of Equation (3), a component phase-matched to the pilot channel signal acts as a signal component, while a component phase-mismatched to the pilot channel signal acts as an interference component. Herein, the component phase-matched to the pilot channel signal is referred to as "in-phase component," and the component phase-mismatched to the pilot channel signal is referred to as "quadrature-phase component." Considering this, the traffic signal power $P_d$ of Equation (4) can be divided into in-phase power $P_i$ and quadrature-phase power $P_q$, as shown in Equation (5) below.

$$P_i = |\underline{w}_m^H R_m S_m \underline{w}_p'|^2 \quad \text{Equation (5)}$$

$$P_q = \underline{w}_m^H R_m S_m \underline{w}_m - |\underline{w}_m^H R_m S_m \underline{w}_p'|^2$$

In Equation (5), $\underline{w}_p'$ is $$\underline{w}_p' = \underline{w}_p / \sqrt{\underline{w}_p^H R_m S_m \underline{w}_p}$$

and represents a normalized weight vector of a pilot channel.

Meanwhile, of the $\underline{s}(t)$ transmitted from the base station BS, an interference signal $r_{exp}(t)$ indicating a traffic channel signal $$\underline{w}_m^H s_m^*(t)$$

to be transmitted only to an mobile station $MS_m$ but flowed out to other mobile stations $MS_i$ (i=1,2,...,M) in a cell, and an interference signal $r_{oc}(t)$ indicating the traffic channel signal flowed out to mobile stations belonging to other cells can be represented by $$r_{exp}(t) = \sum_{\substack{i=1 \\ i \neq m}}^{M} \underline{w}_m^H \underline{h}_i s_m^*(t) \quad \text{Equation (6)}$$

$$r_{oc}(t) = \underline{w}_m^H \underline{h}_{oc} s_m^*(t)$$

Power of the inference signals due to outflow of a signal to other mobile stations inside and outside the cell can be defined as $$P_{exp} = \sum_{\substack{i=1 \\ i \neq m}}^{M} \underline{w}_m^H R_i S_m \underline{w}_m \quad \text{Equation (7)}$$

$$P_{oc} = \underline{w}_m^H R_{oc} S_m \underline{w}_m$$

In Equation (7), $R_{oc}$ denotes a forward link transmission covariance matrix for mobile stations within other cells, and can be represented by $$R_{oc} = E[\underline{h}_{oc} \underline{h}_{oc}^H].$$

In addition, a thermal noise generated within a mobile station can be considered together with interference signals from other mobile stations, and the thermal noise can be given by $$P_{th} = \sigma_{th}^2 \quad \text{Equation (8)}$$

A weight vector for a transmission beam is calculated using the enumerated signal and interference power. First, in order to calculate a direction of a weight vector for a transmission beam for an $m^{th}$ mobile station $MS_m$, a signal-to-inference plus noise ratio (SINR) for forward link beam forming (FLBF) is defined as $$SINR_m^{FLBF} = \quad \text{Equation (9)}$$

$$\frac{P_i}{P_q + P_{exp} + P_{oc}} = \frac{|\underline{w}_m^H R_m S_m \underline{w}_p'|^2}{(\underline{w}_m^H R_m S_m \underline{w}_m - |\underline{w}_m^H R_m S_m \underline{w}_p'|^2) + \sum_{\substack{i=1 \\ i \neq m}}^{M} \underline{w}_m^H R_i S_m \underline{w}_m + \underline{w}_m^H R_{oc} S_m \underline{w}_m}$$

The $$SINR_m^{FLBF}$$

is not a value that can be actually measured in a corresponding mobile station $MS_m$. However, in order to maximize the $$SINR_m^{FLBF}$$

in Equation (9), it is necessary to minimize the sum of a quadrature-phase component power $P_q$ and interference powers $P_{exp}$ and $P_{oc}$ indicating a signal transmitted to a corresponding mobile station $MS_m$ but flowed out to other mobile stations inside and outside a cell while maximizing in-phase component power $P_i$, for a phase of a pilot channel signal serving as a phase criterion during coherent detection. As a result, from the viewpoint of the overall system, actual $$SINR_m^{FLBF}$$

is increased in a mobile station $MS_m$. Therefore, it is possible to define the SINR of Equation (9) instead of using the actual $$SINR_m^{FLBF}.$$

If a transmission beam weight vector $\underline{w}_m$ for maximizing $$SINR_m^{FLBF}$$

is calculated through the definition, the calculated value becomes an optimal weight vector $$\underline{w}_m^{opt}$$

for minimizing phase mismatching between a pilot channel signal and a traffic channel signal and also minimizing power of an interference signal for other mobile stations, thereby achieving objects of the present invention.

In addition, the $$SINR_m^{FLBF}$$

becomes a function of only a transmission beam weight vector $\underline{w}_m$ for an $m^{th}$ mobile station $MS_m$ when a common beam weight vector $\underline{w}_p$ is given. As a result, it is possible to independently optimize the transmission beam weight vector according to mobile stations. Particularly, it can be understood from Equation (9) that $$SINR_m^{FLBF}$$

depends upon only a direction of a forward link channel response vector $\underline{w}_m$ regardless of magnitude of a forward link channel response vector $\underline{w}_m$ from a base station to a corresponding mobile station and a forward link traffic channel signal $S_m$ for the corresponding mobile station. From this, it can be noted that it is possible to independently calculate direction and magnitude of the forward link channel response vector $\underline{w}_m$.

In Equation (9), a calculation result obtained by selecting the optimal forward link weight vector $$\underline{w}_m^{opt}$$

as a value for maximizing $$SINR_m^{FLBF}$$

becomes $$\underline{w}_m' = \underset{\underline{w}_m}{\text{Maximize}}\ SINR_m^{FLBP} \qquad \text{Equation (10)}$$

$$= \left(\sum_{i=1}^{M} R_i + R_{oc}\right)^{-1} R_m \underline{w}_p$$

$$\gamma_m = \underline{w}_m'^H R_m \underline{w}_p$$

$$\underline{w}_m^{opt} = \gamma_m \underline{w}_m'$$

For covariance matrixes used in Equation (10), other means, for example, a forward link covariance matrix fed back from a mobile station $MS_m$ to a base station BS or its equivalent information can be used. When there is no information fed back from the mobile station to the base station, the base station can estimate signals received from mobile stations. A detailed description of this will be made later. A signal $\gamma_m$ received from an $m^{th}$ mobile station $MS_m$ was introduced to calculate $\underline{w}_m$ for maximizing $$SINR_m^{FLBF}$$

and then additionally control a phase between a common beam and a transmission beam.

A description has been made of a method for calculating an optimal weight vector when there is no dedicated pilot channel and only a common pilot channel exists. However, when a dedicated pilot channel exists, a weight vector for the dedicated pilot channel serving as a phase criterion during coherent detection is identical in phase to a weight vector applied to a traffic channel. Therefore, if a dedicated pilot channel exists, a phase mismatching problem between the dedicated pilot channel and the traffic channel does no occur. Thus, Equation (5) can be written as $$P_i = P_d \underline{w}_m^H R_m S_m \underline{w}_m \qquad \text{Equation (11)}$$

$$P_q = 0$$

Therefore, $$SINR_m^{FLBF}$$

for forward link beam forming is defined as $$SINR_m^{FLBF} = \frac{\underline{w}_m^H R_m S_m \underline{w}_m}{\sum_{\substack{i=1 \\ i \neq m}}^{M} \underline{w}_m^H R_i S_m \underline{w}_m + \underline{w}_m^H R_{oc} S_m \underline{w}_m} \qquad \text{Equation (12)}$$

When the dedicated pilot channel exists, an optimal weight vector for a traffic channel represents a value for maximizing $$\underline{w}_m^{opt} = \text{Principal Eigenvector of} \left(\sum_{i=1}^{M} R_i + R_{oc}\right)^{-1} R_m \qquad \text{Equation (13)}$$

Of Equation (12) and is calculated by $$SINR_m^{FLBF}$$

As described above, for forward link beam forming according to presence/absence of the dedicated pilot channel, forward link transmission covariance matrixes $R_m(m=1, 2, \ldots, M)$ and $R_{oc}$, i.e.

$$R_m^{FL}(m = 1, 2, \ldots, M)$$

and $$R_{oc}^{FL},$$

are required as illustrated in Equation (13). So far, a reverse link (RL) related signal and a forward link (FL) related signal have not been distinguished for purposes of simplicity, since they may not be confused. However, henceforth, a superscription 'FL' will be used for a forward link and a superscription 'RL' will be used for a reverse link, for signal distinguishment. As stated above, if such information is provided from a mobile station, the information can be used as it is. In contrast, if the information is not provided, a base station must estimate a forward link covariance matrix from a signal received from a mobile station. However, since a reverse link covariance matrix $$R_m^{RL} S_m^{RL}$$

is obtained from the received reverse link signal, the base station is required to first estimate transmission power $$S_m^{RL}$$

of a mobile station $MS_m$ and to eliminate the estimated transmission power.

In the current mobile communication standard, a base station BS has no way to directly receive transmission power $$S_m^{RL}$$

of a mobile station $MS_m$. Instead, the base station BS can indirectly estimate transmission power $$S_m^{RL}$$

of a mobile station $MS_m$, using a reverse power control bit transmitted to the mobile station $MS_m$ every slot for reverse link power control.

Figure 2:
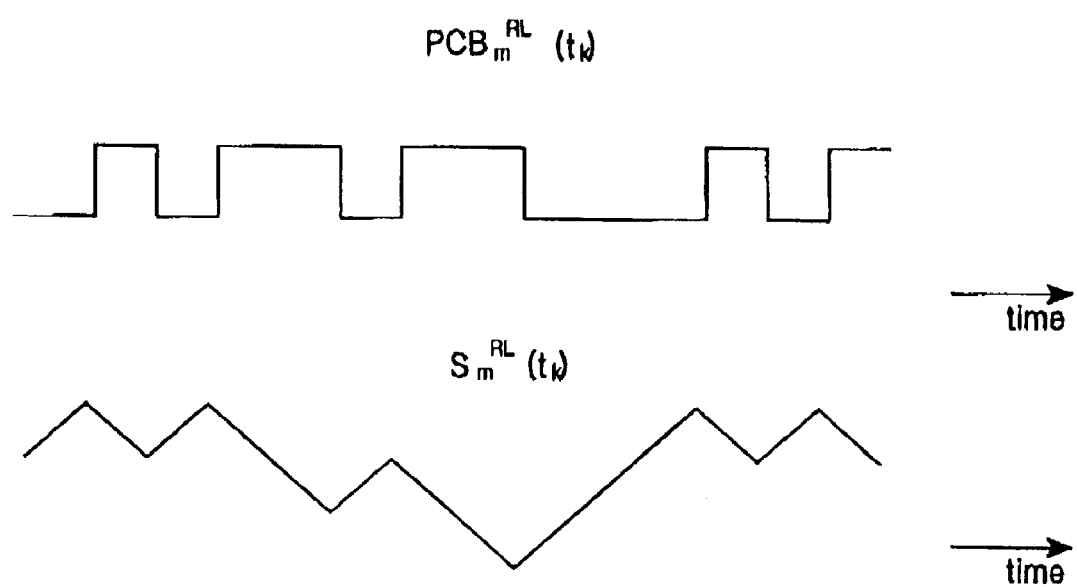
FIG. 2 is a diagram illustrating an example of estimating reverse link transmission power according to an embodiment of the present invention.

FIG. 2 is a diagram illustrating an example of estimating reverse link transmission power according to an embodiment of the present invention. Specifically, FIG. 2 illustrates an example of estimating transmission power $$S_m^{RL}$$

of a mobile station $MS_m$ from a reverse link power control bit. In FIG. 2, $$PCB_m^{RL}(t_k)$$

means a reverse link power control bit that a base station BS transmits to an $m^{th}$ mobile station $MS_m$ every slot $f_k(k=1, 2, \ldots)$ As illustrated in FIG. 2, transmission power of a mobile station is increased or decreased in a predetermined ratio according to $$PCB_m^{RL}(t_k).$$

The transmission power $$S_m^{RL}(t_k)$$

of a mobile station is calculated by $$S_m^{RL}(t_k) = S_0 \cdot 10^{\frac{Increment \times \sum_{j=1}^{k} PCB_m^{RL}(t_j)}{10}} \quad \text{Equation (14)}$$

In Equation (14), 'Increment' represents a transmission power ratio (dB) that increases or decreases according to a reverse link power control bit, and $S_o$ represents initial transmission power. Equation (14) provides a value that the base station BS can calculate, and through this, the base station can estimate transmission power of a mobile station. Equation (14) is given on the assumption that no error occurs during transmission and demodulation of the reverse link power control bit. However, even when an error occurs during transmission of the reverse link power control bit, an actual value can be immediately recovered through feedback of the reverse link power control bit.

When power $$S_m^{RL}$$

of a reverse link traffic channel received from an $m^{th}$ mobile station is estimated, a transmission covariance matrix $$R_m^{RL}$$

for a reverse link channel from the $m^{th}$ mobile station can be calculated from the estimated power. In addition, AOA and beamwidth are estimated from the transmission covariance matrix $$R_m^{RL}$$

for a reverse link channel received from the $m^{th}$ mobile station. Further, a transmission covariance matrix $$R_m^{FL}$$

for a forward link channel to an $m^{th}$ mobile station can be estimated by synthesizing a covariance matrix considering a difference between transmission and reception frequency bands from the estimated AOA and beamwidth.

Even for a transmission covariance matrix $R_{oc}$ for mobile stations in other cells, a similar method can be used. However, it can be difficult to individually detect transmission power of mobile stations inside and outside a cell. In this case, it is necessary to previously determine expected average values of a transmission covariance matrix $R_{oc}$ for mobile stations inside and outside other cells. Generally, since it is assumed that interference from other cells is spatially uniform, the expected average value can be applied without any problem.

A description has been made of a method of simultaneously considering a phase mismatching problem between a common pilot channel signal and a traffic channel signal and an interference problem for other mobile stations when a dedicated pilot channel is not provided. Another method of calculating a direction of an optimal transmission beam weight vector through forward link beam forming considering an interference problem when the dedicated pilot channel is provided. From now on, a description will be made of a process of calculating magnitude of a transmission beam weight vector using forward link power control (FLPC).

Equation (15) shows an example of $$SINR_m^{FLPC}$$

for forward link power control on an $m^{th}$ mobile station $MS_m$ in a cell.

$$SINR_m^{FLPC} = \frac{P_i}{P_q + P_{imp} + P_p + P_{th}} \quad \text{Equation (15)}$$

The $$SINR_m^{FLPC}$$

is a value that can directly measured by an $m^{th}$ mobile station $MS_m$. The $$SINR_m^{FLPC}$$

for forward link power control can be defined differently according to systems. In the present example, since a forward link power control function provided in an existing CDMA system will be applied as is, a detailed definition of $$SINR_m^{FLPC}$$

is not important.

An $m^{th}$ mobile station $MS_m$ compares a target value of the $$SINR_m^{FLPC}$$

with its current bit measured value, and determines a forward link power control bit $$PCB_m^{FL}$$

according to the comparison result. A base station BS receives the forward link power control bit $$PCB_m^{FL}$$

over a reverse link channel, and determines signal power $$S_m^{FL}$$

of a forward traffic channel, i.e., magnitude of a weight vector for a transmission beam, according to a value of the received forward link power control bit.

By calculating a direction of an optimal weight vector of each mobile station through forward link beam forming and independently calculating desired base station transmission power through forward link power control, a smart antenna adopting a forward link beam forming algorithm proposed herein can achieve a desired SINR with minimum base station transmission power, as compared with an omnidirectional antenna or a sector antenna. Thus, it is possible to increase the number of available mobile stations in a cell, contributing to an increase in subscriber capacity, an object of the smart antenna.

A detailed description will now be made of an embodiment of the present invention with reference to the accompanying drawings.

Figure 3:
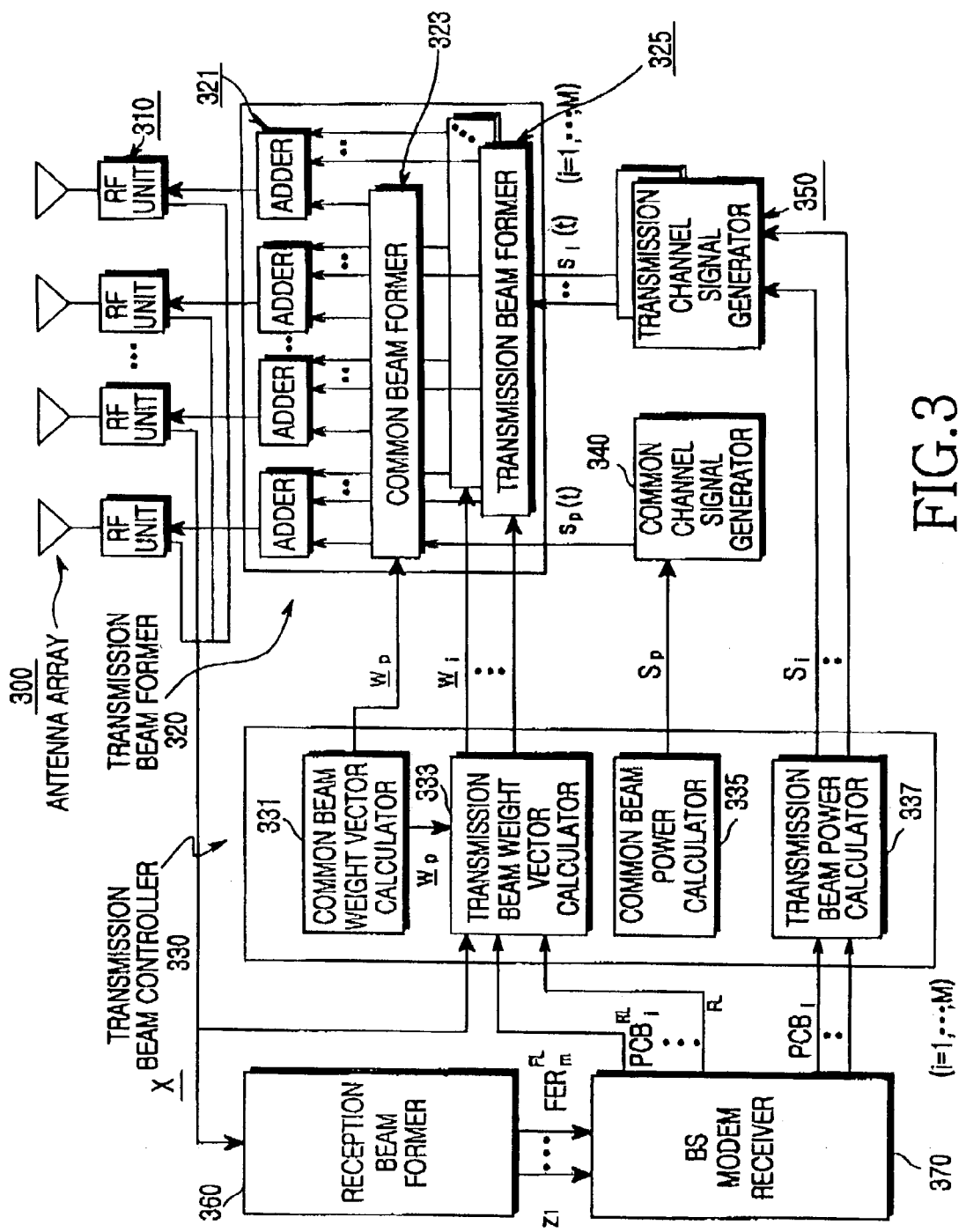
FIG. 3 is a detailed block diagram illustrating an example of components of a base station transmission apparatus with an antenna array according to an embodiment of the present invention.

FIG. 3 is a detailed block diagram illustrating an example of components of a base station transmission apparatus with an antenna array according to an embodiment of the present invention. As illustrated, the transmission apparatus for a base station includes an antenna array 300, an RF (Radio Frequency) part 310, a transmission beam former 320, a transmission beam controller 330, a common channel signal generator 340, a transmission channel signal generator 350, a reception beam former 360, and a base station modem receiver 370. It is assumed that the base station is currently communicating with M mobile stations in the cell.

It is assumed that the antenna array 300 is comprised of N identical antenna elements. An antenna array can be classified into a transmission antenna array and a reception antenna array. Here, a description will be made with reference to the transmission antenna array. However, a hardware structure of the antenna array is commonly designed such that it can be jointly used for both transmission and reception by use of a duplexer. The antenna array 300 transmits transmission beams formed by the transmission beam former 320, and provides RF signals received from several mobile stations inside and outside a cell to the RF part 310.

The RF part 310 is comprised of N RF units corresponding to the N antenna elements of the antenna array 300, and each RF unit is connected to its associated antenna element. Each RF unit, though not illustrated, includes a low-noise amplifier, a frequency down converter, and an analog-to-digital (A/D) converter. The RF part 310 converts RF signals received from mobile stations via the antenna array 300 into a baseband digital reception signal $\underline{x}$.

The reception beam former 360 converts the baseband digital reception signal $\underline{x}$ output from the RF part 310 into beams $z_i$(i=1,2, . . . ,M) formed as to mobile stations, and provides the output beams to the base station modem receiver 370. The reception beam former 360 serves as a spatial filter capable of amplifying or eliminating a signal based on a direction of a signal received from each mobile station via the antenna array 300. When a RAKE receiver, not shown for purposes of simplicity, is used to eliminate an interference signal due to multipath fading, the reception beam former 360 can be positioned before or after a demodulator in each finger of the RAKE receiver.

The base station modem receiver 370 modulates the beams $z_i$(i=1,2, . . . ,M) output from the reception beam former 360 into voice or data signals of corresponding mobile stations. In addition, the base station modem receiver 370 restores forward link power control bits $$PCB_i^{FL}(i = 1, 2, \ldots, M)$$

transmitted from corresponding mobile stations and measures SINR for the corresponding mobile stations, thereby determining reverse link power control bits $$PCB_i^{RL}(i = 1, 2, \ldots, M).$$

Moreover, the base station modem receiver 370 restores a forward link FER transmitted from a corresponding mobile station by help of an upper layer.

The transmission beam controller 330 calculates weight vectors for controlling forming of transmission beams, and includes a common beam weight vector calculator 331, a transmission beam weight vector calculator 333, a common beam power calculator 335 and a transmission beam power calculator 337. In embodiments of the present invention, the calculators can be optionally implemented by hardware or software.

The transmission beam former 320 includes a common beam former 323 for forming a common beam, M transmission beam formers 325 for forming transmission beams for M mobile stations, and N adders 321 for forming M forward transmission beams by adding the common beam to the M transmission beams, and then providing the formed forward transmission beams to the N RF units corresponding thereto.

A detailed description will now be made of an operation of forming transmission beams by a base station having the structure stated above.

RF signals received from several mobile stations inside and outside the cell through N antenna elements of the antenna array 300 are converted into baseband digital reception signal $\underline{x}$ by the RF part 310, and then provided to the reception beam former 360 and the transmission beam weight vector calculator 333. The transmission beam weight vector calculator 333 calculates forward link transmission covariance matrixes $$R_i^{FL}(i = 1, 2, \ldots, M)$$

in the above-stated method by receiving the baseband digital reception signal $\underline{x}$ from the RF part 310 and the reverse link power control bits $$PCB_i^{RL}(i = 1, 2, \ldots, M)$$

from the base station modem receiver 370. When a dedicated pilot channel is not provided, the forward link transmission covariance matrix is calculated using Equation (10) above. In contrast, when the dedicated pilot channel is provided, the forward link transmission covariance matrix is calculated using Equation (13) above. Therefore, the transmission beam weight vector calculator 333 can be designed to include both of the two calculation methods so that it can optionally use one of the two calculation methods. In an embodiment of the present invention, the transmission beam weight vector calculator 333 can be designed to include only a calculation method corresponding to a particular system. In this method, the transmission beam weight vector calculator 333 calculates optimal transmission beam weight vectors $\underline{w}_i$(i=1,2, . . . ,M) for the mobile stations on a real-time basis, and provides the optimal transmission beam weight vectors to the corresponding transmission beam formers 325.

The transmission beam power calculator 337 calculates transmission beam powers $S_i$(i=1,2, . . . ,M) for the mobile stations by receiving the forward link power control bits $$PCB_i^{FL}(i = 1, 2, \ldots, M)$$

from the base station modem receiver 370, and provides the calculated transmission beam powers to the transmission channel signal generators 350. Each transmission channel signal generator 350 generates transmission channel signals $s_i(i=1,2,\ldots,M)$ by multiplying the transmission channel signals having a unit magnitude by square roots of the transmission beam powers $S_i(i=1,2,\ldots,M)$, and provides the generated transmission channel signals to the corresponding transmission beam former 325.

The transmission beam formers 325 form transmission beams by multiplying optimal transmission beam vectors $\underline{w}_i(i=1,2,\ldots,M)$ for the mobile stations by the transmission channel signals $s_i(i=1,2,\ldots,M)$. The transmission beams formed in this manner are provided to the adders 321 associated with the N antenna elements of the antenna array 300.

A weight vector for a common beam is determined by the common beam weight vector calculator 331 and the common beam power calculator 335. The common beam weight vector calculator 331 previously calculates a common beam weight vector $\underline{w}_p$ capable of covering a cell or a sector, and provides the calculated common beam weight vector to the common beam former 323. Meanwhile, the common beam power calculator 335 previously calculates common beam power $S_p$, and provides the calculated common beam power to the common channel signal generator 340. The common channel signal generator 340 generates a common channel signal $s_p$ by multiplying a common channel signal having a unit magnitude by a square root of the common beam power $S_p$, and provides the generated common channel signal to the common beam former 323.

The common beam former 323 multiplies the common channel signal $s_p$ by the common beam weight vector $\underline{w}_p$, and provides its output to the adders 321 associated with the N antenna elements of the antenna array 300.

The adders 321 form base station transmission signal vectors $\underline{s}(t)$ by summing up outputs of the common beam former 323 and the transmission beam formers 325, and provide their outputs to the corresponding RF units of the RF part 310. The transmission signal vectors $\underline{s}(t)$ from the base station to the mobile stations are converted into RF signals by the RF units 310 after being power-amplified through a D/A converter, a frequency up converter and a power amplifier, and then transmitted to the mobile stations in the cell over forward link channels through the antenna array 300.

Figure 4:
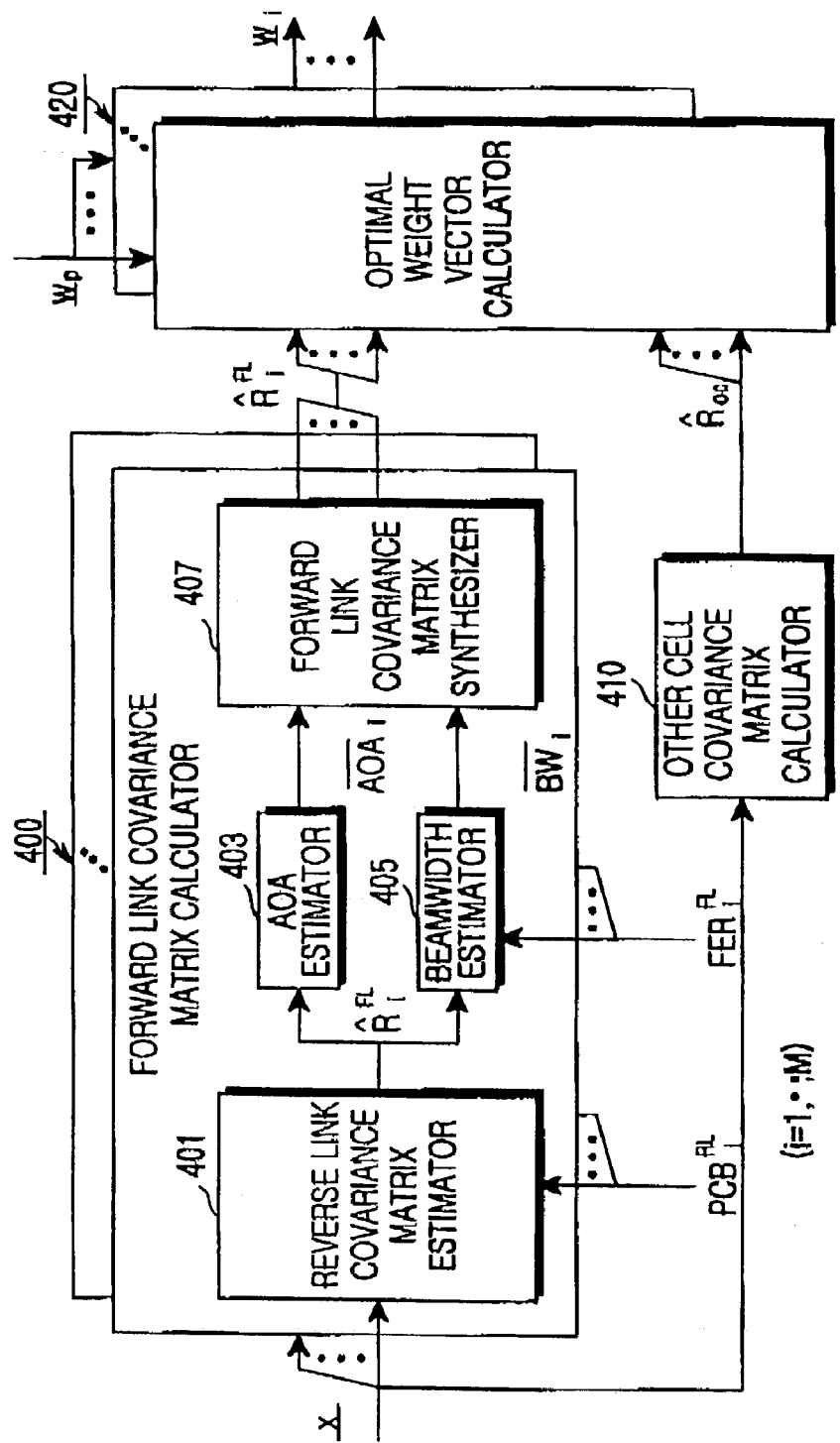
FIG. 4 is a detailed block diagram illustrating an example of components of a transmission beam weight vector calculator according to an embodiment of the present invention.

FIG. 4 is a detailed block diagram illustrating an example of components of the transmission beam weight vector calculator 333 shown in FIG. 3. Specifically, FIG. 4 illustrates an apparatus and method for estimating forward link covariance matrixes for M mobile stations $MS_i(i=1, 2,\ldots,M)$ from a reverse link base station reception signal vector $\underline{x}$. Although the forward link covariance matrix can be estimated from the reverse link base station reception signal vector as mentioned above, it can also be directly fed back from the mobile stations or can be calculated using other methods. In addition, it should be appreciated by those skilled in the art that although the transmission beam weight vector calculator 333 is realized by hardware in FIG. 4, it can also be implemented by software without departing from the scope of the present invention.

Referring to FIG. 4, the transmission beam weight vector calculator 333 includes M forward link covariance matrix calculators 400 associated with M mobile stations $MS_i(i=1, 2,\ldots,M)$, M optimal weight vector calculators 420, and an other cell covariance matrix calculator 410. Each forward link covariance matrix calculator 400 is comprised of a reverse link covariance matrix estimator 401, an AOA estimator 403, a beamwidth estimator 405, and a forward link covariance matrix synthesizer 407.

The reverse link covariance matrix estimator 401 first calculates a covariance matrix $$R_i^{RL} S_i^{RL}$$

for an $i^{th}$ mobile station $MS_i$ by receiving the baseband digital reception signal vector $\underline{x}$. Further, the reverse link covariance matrix estimator 401 estimates mobile station transmission power $$S_i^{RL}$$

using a reverse link power control bit $$PCB_i^{RL},$$

and then calculates a reverse link transmission covariance matrix $$R_i^{RL}$$

of an $i^{th}$ mobile station from the estimated mobile station transmission power. The reverse link covariance matrix estimator 401 provides the calculated reverse link covariance matrix to the AOA estimator 403 and the beamwidth estimator 405. The AOA estimator 403 and the beamwidth estimator 405 calculate an AOA estimation value $AOA_i$ and a beamwidth estimation value $BW_i$ for a corresponding mobile station from the reverse link covariance matrix estimation value $$R_i^{RL},$$

and provide the calculated $AOA_i$ and $BW_i$ to the forward link covariance matrix synthesizer 407. In an abnormal state where FER is increased abruptly for some reason, the beamwidth estimator 405 detects the abrupt increase in the FER from a forward link $$FER_i^{FL}$$

received from a mobile station and then increases or decreases the beamwidth by a predetermined value, thereby appropriately coping with the abnormal state.

The forward link covariance matrix synthesizer 407 synthesizes a forward link covariance matrix estimation value $$R_i^{FL}$$

from the AOA estimation value $AOA_i$ and the beamwidth estimation value $BW_i$, and provides the synthesized forward link covariance matrix estimation value to the optimal weight vector calculator 420. In an FDD (Frequency Division Duplexing) system where a transmission frequency band is different from a reception frequency band, a difference between the transmission frequency and the reception frequency is compensated for in the forward link covariance matrix synthesizer 407.

The other cell covariance matrix calculator 410 calculates a covariance matrix estimation value $R_{oc}$ for interference to mobile stations in other cells due to a transmission channel signal for an $i^{th}$ mobile station $MS_i$, by receiving the baseband digital reception signal vector $\underline{x}$, and providing the calculated covariance matrix estimation value to the optimal weight vector calculator 420. Estimation of the reverse link covariance matrix and the other cell covariance matrix can be performed using a known technique. For example, a method disclosed in "Performance Analysis of CDMA Mobile Communication Systems using Antenna Arrays", B. Suard, A. Naguib, G, Xu, A. Paulraj, Proc. ICASSP, 1993, which is incorporated herein by reference, can be used.

The optimal weight vector calculator 420 calculates an optimal weight vector $\underline{w}_i$ in accordance with Equation (10) or Equation (11) by receiving a forward link covariance matrix estimation value $R_i$ for an $i^{th}$ mobile station $MS_i$ from the forward link covariance matrix calculator 400, an estimation value $R_{oc}$ from the other cell covariance matrix calculator 410, and a common beam weight vector $\underline{w}_p$ from the common beam weight vector calculator 331, and then provides the calculated optimal weight vector to the transmission beam former 325.

Figure 5:
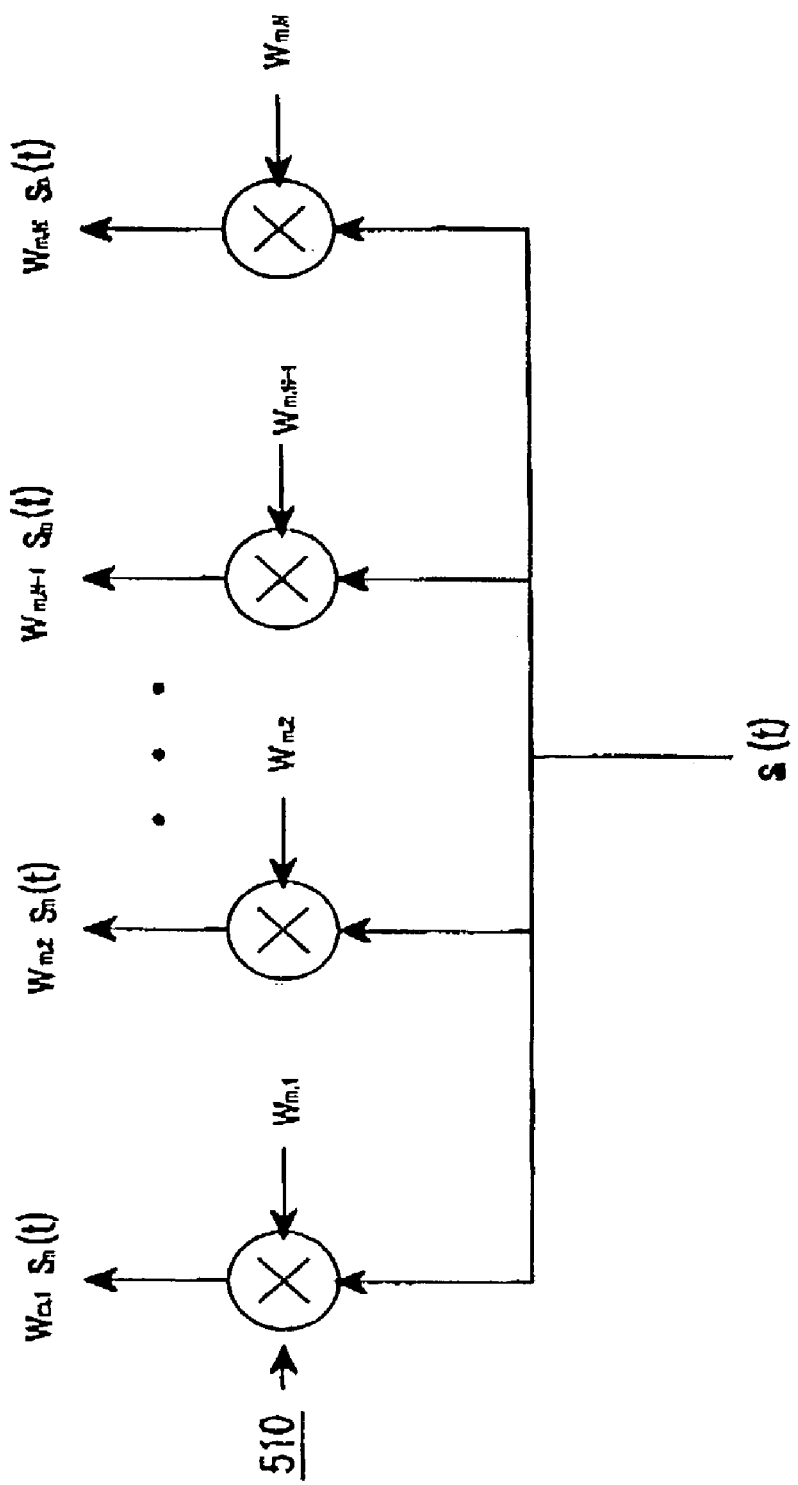
FIG. 5 is a diagram illustrating an example of a transmission beam former according to an embodiment of the present invention.

FIG. 5 is a diagram illustrating an example of the transmission beam former 325 for an $m^{th}$ mobile station $MS_m$ according to an embodiment of the present invention. If it is assumed that the antenna array of the base station includes N antenna elements, the transmission beam former 325 includes N complex multipliers 510 associated with the antenna elements. A transmission beam weight vector $\underline{w}_m$ for an $m^{th}$ mobile station $MS_m$ is divided into N elements associated with the antenna elements, and then applied to the corresponding complex multipliers 510. It is well known that the $\underline{w}_m$ can be represented by $\underline{w}_m = [w_{m,1} w_{m,2} \ldots w_{m,N-1} w_{m,N}]^T$. The complex multipliers 510 complex-multiply a traffic channel signal $s_m(f)$ for an $m^{th}$ mobile station $MS_m$ by the elements of the weight vector $\underline{w}_m$, and provide their outputs to the corresponding adders 321.

Although the transmission beam former 325 for an $m^{th}$ mobile station $MS_m$ is illustrated in FIG. 5, transmission beam formers for other mobile stations also have the same structure. Also, common beam formers for other mobile stations have the same structure as the common beam former 323.

Figure 6:
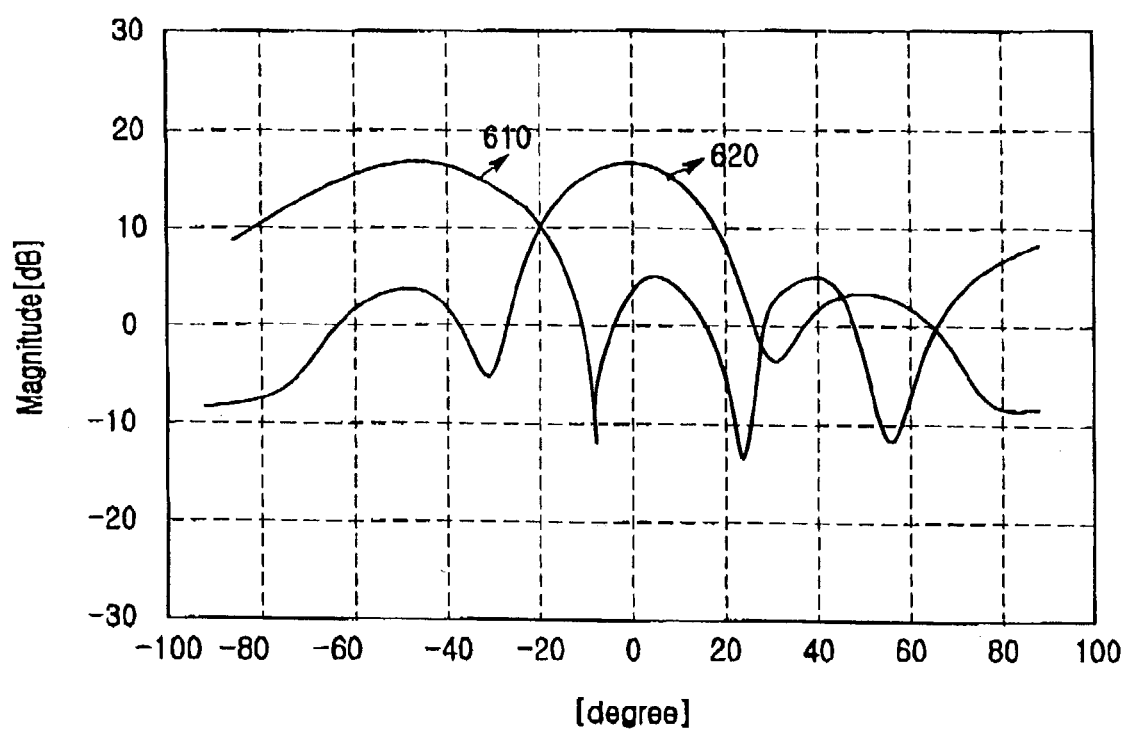
FIG. 6 is a graph illustrating a forward link transmission beam pattern according to the prior art in terms of magnitude and degree.
Figure 7:
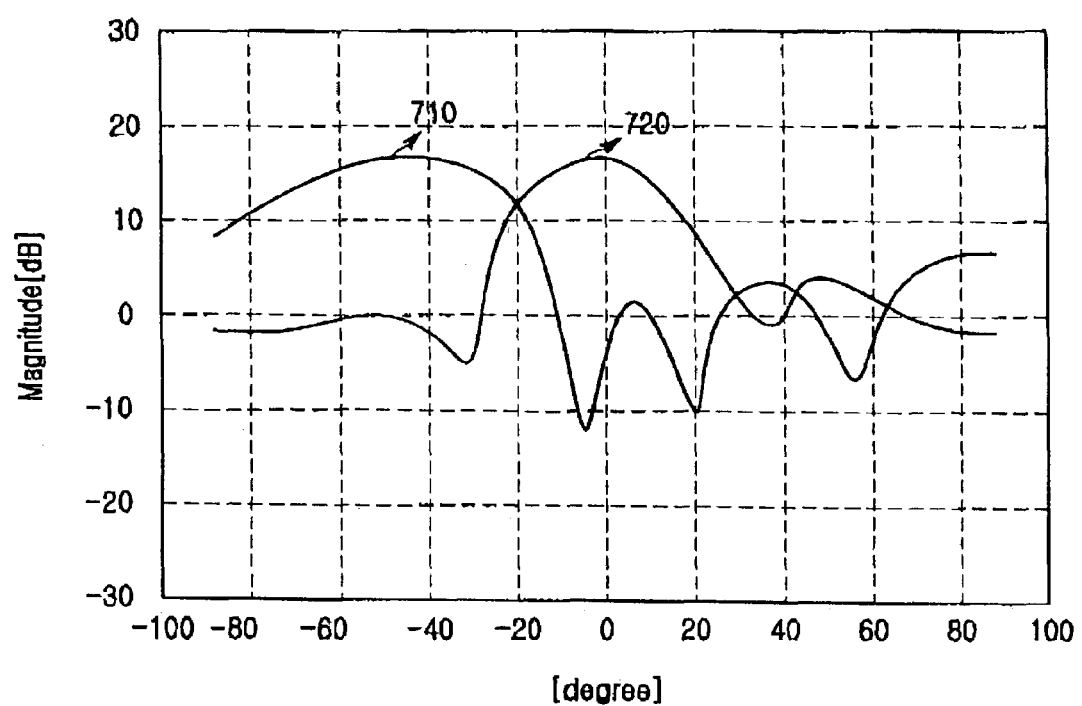
FIG. 7 is a graph illustrating a forward link transmission beam pattern according an embodiment of the present invention in terms of magnitude and degree.

FIG. 6 is a graph illustrating a forward link transmission beam pattern according to the prior art in terms of magnitude and degree, and FIG. 7 is a graph illustrating a forward link transmission beam pattern according to an embodiment of the present invention in terms of magnitude and degree. FIGS. 6 and 7 are based on the assumption that the number of forward link transmission beams is 2 in a base station's linear antenna array that has 4 antenna elements and a gap between the antenna elements is half a wavelength. Specifically, FIG. 6 illustrates a forward link transmission beam pattern formed by considering only AOA and beamwidth from a signal received at the base station from the mobile station, and FIG. 7 illustrates a forward link transmission beam pattern formed according to an embodiment of the present invention. It is further assumed in FIGS. 6 and 7 that forward link transmission beams 610 and 710 shown by solid lines are for AOA=−40° and beamwidth=20°, and forward link transmission beams 620 and 720 also shown by solid lines are for AOA=−0° and beamwidth=20°.

It can be understood that compared with the forward link transmission beam pattern illustrated in FIG. 6, the forward link transmission beam pattern illustrated in FIG. 7 has interference reduced by about 3 to 4 dB within a non-transmission angle range. That is, when a forward link transmission beam is formed according to the disclosed embodiments of the present invention, it is possible to increase the amount of subscriber capacity by the same amount as the reduction in the interference signal.

As described above, the disclosed embodiments of the present invention can form an optimal transmission beam for minimizing phase mismatching between a common beam and a transmission beam and also minimize interference to other mobile stations due to the transmission beam. That is, the invention can achieve high performance forward link transmission, and contribute to an increase in bandwidth capacity of a mobile communication system, improvement in call quality, and a reduction in transmission power of a mobile station.

While the invention has been shown and described with reference to certain embodiments thereof, it will be understood by those skilled in the art that various changes in form and details may be made therein without departing from the spirit and scope of the invention as defined by the appended claims.

What is claimed is:

1. A transmission beam forming control apparatus of a base station, for forming a transmission beam for a transmission channel signal to be transmitted to a mobile station from an antenna array including a plurality of antenna elements, the apparatus comprising:

a transmission beam weight vector calculator for estimating a direction of the mobile station by using a reception signal and a reverse link power control bit received from the mobile station, and calculating a transmission beam weight vector in the estimated direction, wherein the transmission beam weight vector calculator comprises an optimal weight vector calculator for calculating an optimal weight vector of the transmission beam by using first and second forward link covariance matrix values respectively for said mobile station and other mobile stations and the weight vector for a common channel signal; and a transmission beam former for applying the calculated transmission beam weight vector to the transmission channel signal and providing the applied transmission channel signal to the antenna array.

2. The transmission beam forming control apparatus of claim 1, wherein the transmission beam weight vector calculator further comprises:

a first forward link covariance matrix calculator for calculating an estimation value of the forward link covariance matrix by using a signal received from the mobile station via the antenna array, a reverse link power control value of the mobile station, and a frame error rate; and a second forward link covariance matrix calculator for calculating an estimation value of the forward link covariance matrix for other mobile stations.

3. The transmission beam forming control apparatus of claim 2, wherein the second forward link covariance matrix calculator calculates the weight vector by considering an expected average transmission power value for other mobile stations.

4. The transmission beam forming control apparatus of claim 2, wherein the first forward link covariance matrix calculator comprises:
- a reverse link covariance matrix estimator for estimating a reverse link covariance matrix by using a signal received from the mobile station via the antenna array and a reverse link power control signal;
- an AOA (Angle of Arrival) estimator for estimating an arrival angle of a signal from the reverse link covariance matrix value;
- a beamwidth estimator for determining a beamwidth of a forward link signal by using the reverse link covariance matrix value and the frame error rate; and
- a forward link covariance matrix synthesizer for synthesizing a forward link covariance matrix by using an output of the AOA estimator and an output of the beamwidth estimator.

5. The transmission beam forming control apparatus of claim 2, wherein the optimal weight vector calculator calculates a transmission beam weight vector for maximizing a signal-to-interference plus noise ratio (SINR) for the forward link beam forming, the SINR being defined as $$SINR = \frac{P_i}{P_q + P_{exp} + P_{oc}}$$

where $P_i$ represents in-phase component power for the common channel signal, $P_q$ represents quadrature-phase component power for the common channel signal, $P_{exp}$ represents interference power due to the transmission channel signal for other mobile stations located inside a cell serviced by the base station, and $P_{oc}$ represents interference power due to the transmission channel signal for other mobile stations located outside the cell.

6. The transmission beam forming control apparatus of claim 5, wherein the optimal weight vector calculator calculates a weight vector for the transmission beam in accordance with the following equation $$\underline{w}_m^{opt} = \gamma_m \underline{w}_m'$$

$$\underline{w}_m' = \left(\sum_{i=1}^M R_i + R_{oc}\right)^{-1} R_m \underline{w}_p$$

$$\gamma_m = \underline{w}_m' R_m \underline{w}_p$$

where $$\underline{w}_m^{opt}$$

represents an optimal weight vector of a transmission beam for the mobile station, M represents the number of mobile stations currently serviced by the base station, $R_i$ represents a transmission covariance matrix for an $i^{th}$ mobile station among M mobile stations serviced by the base station, $\underline{R}_{oc}$ represents an interference covariance matrix value for mobile stations serviced by other base stations, and $\underline{w}_P$ represents a common beam weight vector.

7. The transmission beam forming control apparatus of claim 2, wherein the optimal weight vector calculator calculates a transmission beam weight vector for maximizing a signal-to-interference plus noise ratio (SINR) for forward link beam forming, the SINR being defined as $$SINR = \frac{P_d}{P_{exp} + P_{oc}}$$

where $P_d$ represents power of the transmission channel signal, $P_{exp}$ represents interference power due to the transmission channel signal for other mobile stations located inside a cell serviced by the base station, and $P_{oc}$ represents interference power due to the transmission channel signal for other mobile stations located outside the cell.

8. The transmission beam forming control apparatus of claim 7, wherein a direction of the transmission beam weight vector for maximizing the SINR is calculated by $$\underline{w}_m^{opt} = \text{Principal Eigenvector of } \left(\sum_{i=1}^M R_i + R_{oc}\right)^{-1} R_m$$

where $$\underline{w}_m^{opt}$$

represents an optimal weight vector of a transmission beam for the mobile station, M represents the number of mobile stations currently serviced by the base station, $R_i$ represents a transmission covariance matrix for an $i^{th}$ mobile station among M mobile stations serviced by the base station, and $\underline{R}_{oc}$ represents an interference covariance matrix value for mobile stations serviced by other base stations.

9. The transmission beam forming control apparatus of claim 1, wherein a beamwidth of the transmission beam weight vector is determined according to a frame error rate (FER) during calculation of the transmission beam weight vector.

10. The transmission beam forming control apparatus of claim 1, wherein the transmission beam weight vector calculator minimizes phase mismatching between the common channel signal and the transmission channel signal by dividing power of the transmission channel signal into an in-phase power component and a quadrature-phase power component for the common channel signal, maximizing the in-phase power component and minimizing the quadrature-phase power component.

11. The transmission beam forming control apparatus of claim 1, wherein the transmission beam weight vector calculator calculates a transmission beam weight vector so as to minimize phase mismatching between the common channel signal and the transmission channel signal.

12. A transmission beam forming control method of a base station, for forming a transmission beam for a transmission channel signal to be transmitted to a mobile station from an antenna array including a plurality of antenna elements, the method comprising the steps of:
- estimating a direction of the mobile station by using a reception signal and a reverse link power control bit received from the mobile station, and calculating a transmission beam weight vector in the estimated direction;

calculating an optimal weight vector of the transmission beam from first and second forward link covariance matrix values respectively for the mobile station and other mobile stations and the weight vector for a common channel signal;

applying the calculated transmission beam weight vector to the transmission channel signal; and providing the applied transmission channel signal to the antenna array.

13. The transmission beam forming control method of claim 12, wherein the transmission beam weight vector calculator calculates a transmission beam weight vector so as to minimize phase mismatching between a common channel signal and the transmission channel signal.

14. The transmission beam forming control method of claim 12, wherein the transmission beam weight vector calculation step comprises the steps of:

calculating an estimation value first forward link covariance matrix by using a signal received from the mobile station via the antenna array, a reverse link power control value of the mobile station, and a frame error rate; and calculating an estimation value second forward link covariance matrix for other mobile stations.

15. The transmission beam forming control method of claim 14, wherein the second forward link covariance matrix estimation value calculation step comprises the step of calculating the weight vector by considering an expected average transmission power value for other mobile stations.

16. The transmission beam forming control method of claim 14, wherein the first forward link covariance matrix calculation step comprises the steps of:

estimating a reverse link covariance matrix by using a signal received from the mobile station via the antenna array and a reverse link power control signal;

estimating an arrival angle of a signal from the reverse link covariance matrix value;

determining a beamwidth of a forward link signal by using the reverse link covariance matrix value and the frame error rate; and synthesizing a forward link covariance matrix by using the estimated arrival angle and the determined beamwidth.

17. The transmission beam forming control method of claim 14, wherein the optimal weight vector calculation step comprises the step of calculating a transmission beam weight vector for maximizing a signal-to-interference plus noise ratio (SINR) for forward link beam forming, the SINR being defined as $$SINR = \frac{P_i}{P_q + P_{exp} + P_{oc}}$$

where $P_i$ represents in-phase component power for the common channel signal, $P_q$ represents quadrature-phase component power for the common channel signal, $P_{exp}$ represents interference power due to the transmission channel signal for other mobile stations located inside a cell serviced by the base station, and $P_{oc}$ represents interference power due to the transmission channel signal for other mobile stations located outside the cell.

18. The transmission beam forming control method of claim 17, wherein the transmission beam weight vector for maximizing the SINR is calculated by $$\underline{w}_m^{opt} = \gamma_m \underline{w}_m'$$

$$\underline{w}_m' = \left(\sum_{i=1}^{M} R_i + R_{oc}\right)^{-1} R_m \underline{w}_p$$

$$\gamma_m = \underline{w}_m' R_m \underline{w}_p$$

where $$\underline{w}_m^{opt}$$

represents an optimal weight vector of a transmission beam for the mobile station, M represents the number of mobile stations currently serviced by the base station, $R_i$ represents a transmission covariance matrix for an $i^{th}$ mobile station among M mobile stations serviced by the base station, $\underline{R}_{oc}$ represents an interference covariance matrix value for mobile stations serviced by other base stations, and $\underline{w}_p$ represents a common beam weight vector.

19. The transmission beam forming control method of claim 14, wherein the optimal weight vector calculation step comprises the step of calculating a transmission beam weight vector for maximizing a signal-to-interference plus noise ratio (SINR) for forward link beam forming, the SINR being defined as $$SINR = \frac{P_d}{P_{exp} + P_{oc}}$$

where $P_d$ represents power of the transmission channel signal, $P_{exp}$ represents interference power due to the transmission channel signal for other mobile stations located inside a cell serviced by the base station, and $P_{oc}$ represents interference power due to the transmission channel signal for other mobile stations located outside the cell.

20. The transmission beam forming control method of claim 19, wherein a direction of the transmission beam weight vector for maximizing the SINR is calculated by $$\underline{w}_m^{opt} = \text{Principal Eigenvector of } \left(\sum_{i=1}^{M} R_i + R_{oc}\right)^{-1} R_m$$

where $$\underline{w}_m^{opt}$$

represents an optimal weight vector of a transmission beam for the mobile station, M represents the number of mobile stations currently serviced by the base station, $R_i$ represents a transmission covariance matrix for an $i^{th}$ mobile station among M mobile stations serviced by the base station, and $\underline{R}_{oc}$ represents an interference covariance matrix value for mobile stations serviced by other base stations.

21. The transmission beam forming control method of claim 12, wherein the transmission beam weight vector calculation step comprises the step of minimizing phase mismatching between the common channel signal and the transmission channel signal by dividing power of the transmission channel signal into an in-phase power component and a quadrature-phase power component for the common channel signal, maximizing the in-phase power component and minimizing the quadrature-phase power component.

22. An apparatus for forming a transmission beam for a transmission channel signal to be transmitted to each of mobile stations in a base station apparatus including an antenna array having a plurality of antenna elements, the base station apparatus communicating with the mobile stations, the apparatus comprising:
 a reception beam former for separating baseband signals received from the antenna elements according to mobile stations;
 a base station modem receiver for calculating and extracting a frame error rate and a forward link power control bit for each mobile station from the signals received from the reception beam former;
 a transmission beam controller for calculating a transmission beam weight vector and transmission beam power for minimizing phase mismatching between a common channel signal and the transmission channel signal by using the baseband signal and an output of the base station modem receiver;
 a transmission channel signal generator for generating data to be transmitted to each mobile station; and
 a transmission beam former for forming a transmission beam by applying the calculated weight vector to an output of the transmission channel signal generator.

23. The apparatus of claim 22, wherein the transmission beam controller comprises:
 a transmission beam weight vector calculator for calculating a transmission beam weight vector for minimizing phase mismatching between a common channel signal and the transmission channel signal by using the baseband signal and an output of the base station modem receiver; and
 a transmission beam power calculator for calculating transmission beam power by using a power control bit for each mobile station.

24. The apparatus of claim 23, wherein the transmission beam weight vector calculator calculates a transmission beam weight vector for maximizing a signal-to-interference plus noise ratio (SINR) for forward link beam forming, the SINR being defined as $$SINR = \frac{P_i}{P_q + P_{exp} + P_{oc}}$$

where $P_i$ represents in-phase component power for the common channel signal, $P_q$ represents quadrature-phase component power for the common channel signal, $P_{exp}$ represents interference power due to the transmission channel signal for other mobile stations located inside a cell serviced by the base station, and $P_{oc}$ represents interference power due to the transmission channel signal for other mobile stations located outside the cell.

25. The apparatus of claim 24, wherein the transmission beam weight vector calculator calculates a weight vector for the transmission beam in accordance with the following equation $$\underline{w}_m^{opt} = \gamma_m \underline{w}_m'$$

$$\underline{w}_m' = \left(\sum_{i=1}^{M} R_i + R_{oc}\right)^{-1} R_m \underline{w}_p$$

$$\gamma_m = \underline{w}_m' R_m \underline{w}_p$$

where $$\underline{w}_m^{opt}$$

represents an optimal weight vector of a transmission beam for the mobile station, M represents the number of mobile stations currently serviced by the base station, $R_i$ represents a transmission covariance matrix for an $i^{th}$ mobile station among M mobile stations serviced by the base station, $\underline{R}_{oc}$ represents an interference covariance matrix value for mobile stations serviced by other base stations, and $\underline{w}_p$ represents a common beam weight vector.

26. The apparatus of claim 24, wherein the transmission beam weight vector calculator calculates a transmission beam weight vector for maximizing a signal-to-interference plus noise ratio (SINR) for forward link beam forming, the SINR being defined as $$SINR = \frac{P_d}{P_{exp} + P_{oc}}$$

where $P_d$ represents power of the transmission channel signal, $P_{exp}$ represents interference power due to the transmission channel signal for other mobile stations located inside a cell serviced by the base station, and $P_{oc}$ represents interference power due to the transmission channel signal for other mobile stations located outside the cell.

27. The apparatus of claim 26, wherein a direction of the transmission beam weight vector for maximizing the SINR is calculated by $$\underline{w}_m^{opt} = Principal\ Eigenvector\ of\ \left(\sum_{i=1}^{M} R_i + R_{oc}\right)^{-1} R_m$$

where $$\underline{w}_m^{opt}$$

represents an optimal weight vector of a transmission beam for the mobile station, M represents the number of mobile stations currently serviced by the base station, $R_i$ represents a transmission covariance matrix for an $i^{th}$ mobile station among M mobile stations serviced by the base station, and $\underline{R}_{oc}$ represents an interference covariance matrix value for mobile stations serviced by other base stations.

* * * * *